Figure 1:
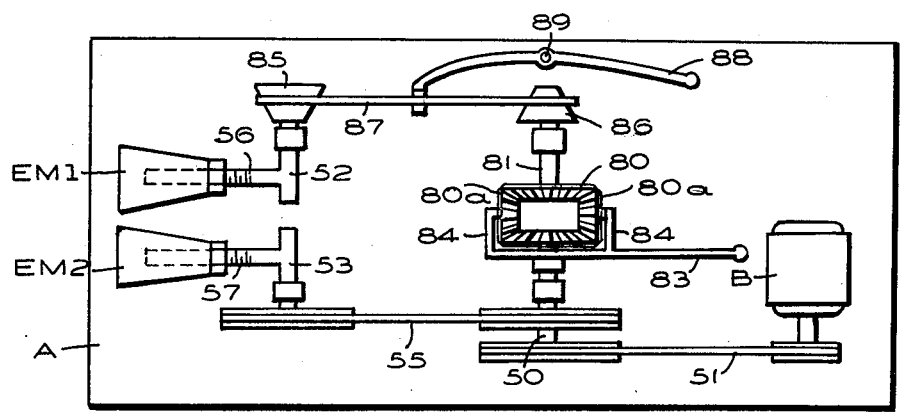

Nov. 30, 1965     R. W. BRANDT, JR     3,220,268
VIBRATION GENERATOR
Filed Dec. 27, 1960

INVENTOR.
RICHARD W. BRANDT, JR.
BY
Munn + Liddy
ATTORNEYS

United States Patent Office 3,220,268
Patented Nov. 30, 1965

1

3,220,268
VIBRATION GENERATOR
Richard W. Brandt, Jr., P.O. Box 253, Brownsville, Calif.
Filed Dec. 27, 1960, Ser. No. 78,347
1 Claim. (Cl. 74—87)

The present invention relates to improvements in a vibration generator, and it consists in the combinations, constructions, and arrangements of parts as hereinafter described and claimed.

This invention pertains to a vibration generator where two or more rotating eccentric masses are used to produce force and motions in such a manner that their characters, and/or magnitude, and/or frequency, and/or direction may be controlled. The mechanical movement is a reaction device in which the centrifugal forces of two or more rotating eccentric masses may be coupled, and/or controlled, and/or directed or located so that forces and/or motions of an infinite variety may be produced.

The vibration generator is unique in that the eccentric masses are caused to rotate in planes that can parallel each other or can extend at a desired angle with respect to each other. The timing, and/or indexing, and/or controlling of the relative position of the eccentric masses in the various planes can be changed by a manual control means or the device may have automatic means which will alter the angular positions of the masses and/or their eccentricities in a predetermined manner. The speed ratio between the rotating masses can be varied to obtain a desired force patterns or vibration where the frequency and the direction of vibration can be varied or controlled. It is also possible to selectively control the eccentricities of the rotating masses by altering the masses or by varying the distances of the masses from their centers of rotations.

The force produced by the rotation of eccentric masses about their centers of rotation is based on Newton's law that for every force there is an equal and opposite force. As the speed of the rotating masses is increased, there is a very rapid increase in centrifugal force. The mechanical movement is mounted on a base and the forces produced by the rotating eccentric masses are transmitted to the base so as to vibrate it at a frequency and in a direction which is a resultant of the rotating eccentric masses. The base may be coupled to any load or machine by any means desired and will cause the load and/or machine to vibrate at the same frequency and in the same directions and at the same magnitude as the base.

The amount of force that can be produced is governed by the weight of the eccentric mass, the distance each eccentric mass is from its center of rotation, the speed of rotation of each eccentric mass, and the number and arrangement of the eccentric masses. By controlling the relative positions, the relative speeds, and the direction of rotation of two or more eccentric masses, the resultant forces produced may be cumulative or they may cancel each other at certain points in the final force pattern produced on the base. This accumulation or cancellation of one rotating force by another, makes it possible to produce force patterns of almost infinite variations. The frequencies developed are controlled by the rotating speeds of the eccentric mases and if the masses rotate at different speeds, a beat frequency may result.

Other objects and advantages will appear as the specification proceeds and the novel features will be set forth in the claim hereunto annexed.

Drawing

My invention is illustrated in the accompanying schematic drawing, in which:

FIGURE 1 is a schematic plan view of my vibration

Figure 2:
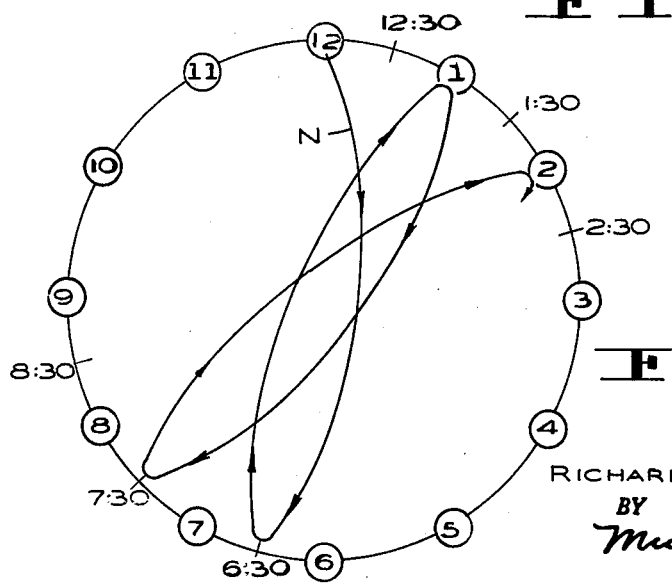

2 generator where the two eccentric masses rotate in opposite directions and at desired variations in speed;

FIGURE 2 is a force diagram of the rotating eccentric masses shown in FIGURE 1, and illustrates how the straight line of force produced by the moving masses can be caused to change angularly with each reciprocation of the masses;

In carrying out my invention I provide a base A and this base has a bearing for supporting a shaft 50. The base also supports an electric motor B and the motor is operatively connected to the shaft 50 by a belt and pulley mechanism 51. Another shaft 53 is rotatably mounted in a bearing which in turn is supported by the base A and this shaft is rotatably connected to the shaft 50 by a belt and pulley mechanism indicated generally at 55.

The shaft 53 has a laterally extending threaded member 57 and an eccentric mass EM2 is threaded upon the member 57 so as to be adjustable toward and away from the axis of the shaft 53. It will be seen from this construction that the motor B is connected to the shaft 53 for rotating the eccentric mass EM2 as soon as the motor is operated.

Another shaft 81 is supported by a bearing which in turn is carried by the base A and this shaft has its axis aligned with the axis of the shaft 50. Differential gearing 80 operatively connects the shaft 50 to the shaft 81. Planetary gears 80a forming a part of the differential gearing 80 are carried by a frame 84 and this frame is free to swing on the shaft 50 and is provided with a handle 83.

The shaft 81 has a cone 86 mounted thereon and this cone is operatively connected to a second cone 85 by an endless belt 87. The cone 85 is mounted on another shaft 52 that is supported by a bearing mounted on the base A and the axis of the shaft 52 is aligned with the axis of the shaft 53. The apex of the cone 85 faces in a direction opposite to that of the apex of the cone 86. The shaft 52 has a lateral extension 56 that is threaded for adjustably receiving an eccentric mass EM1. A hand lever 88 is pivoted to the base at 89 and has a forked end for receiving a portion of the endless belt 87 that extends between the cones 85 and 86. A swinging of the hand lever 88 will move the endless belt 87 along the cones 85 and 86 for causing the shaft 52 to rotate at varying speeds with respect to the shaft 81. In this way the eccentric mass EM1 can be rotated at different speeds with respect to the eccentric mass EM2.

It is also possible to adjust the eccentric mass EM1 angularly with respect to the eccentric mass EM2 by swinging the handle 83 about the shaft 50. This will swing the planetary gears 80a for causing the differential gearing 80 to swing the eccentric mass EM1 angularly. The eccentric mass EM1 will rotate counter-clockwise to the eccentric mass EM2.

The rotational speed of the mass EM1, can be varied with the rotational speed of the mass EM2. When these eccentric masses EM1 and EM2 are rotated in opposite directions at different speeds, the resultant forces developed become an approximately straight line reciprocating force if the differences in rotational speeds are fractional. The approximately straight line forces will constantly change in direction. In other cases the forces produced are increasingly arced as the differential in speed increases.

To illustrate this change of direction, suppose the speeds of the two rotating eccentric masses EM1 and EM2 are arranged so that there is a 1/12 difference in their relative speeds. The force pattern produced will be like a twelve pointed star and a clockface can be used as a reference, see FIGURE 2. If we start at 12 o'clock, a force pattern line N will be developed that will extend from 12 to 6:30, then to 1 o'clock, then to 7:30, then to 2 o'clock, etc. With this 1/12 difference in ratio, the step-like rotation of the approximately straight lines of force may be in a clockwise direction, or it may be in a counterclockwise direction, this depending on which one of the counter rotating masses EM1 and EM2, is rotating the faster. The force pattern will progress an amount equal to one half an hour on the clockface of FIGURE 2, for each half cycle of rotation, or one hour for each full cycle in the direction selected.

FIGURE 2, shows the resulting force line N, in the shape of a slight arc. The arc will increase as the relative speed increases between the two masses EM1 and EM2, and will decrease when the difference in relative speed decreases. For small differences in relative speeds, it is practical to consider these forces as approximately straight line reciprocating forces that constantly change their direction in the plane of rotation in the progressive increments and direction selected.

It is possible to use mechanically fixed speed ratios between the counter-rotating eccentric masses to produce a force line that constantly changes direction. A vibration generator was built in which two counter-rotating eccentric masses were revolved at fixed different speeds. The casing, housing the mechanical movement, was attached to a fruit tree for shaking fruit from its branches. The frequency of vibration applied to the tree when the device was operated, was much greater than the normal flexing moment of the tree. The plane of rotation of the constantly shifting reciprocable approximately straight line of force was applied to the tree at right angles to the axis of the tree trunk. The tree trunk was shaken in a horizontal plane and from different straight line directions in a progressive manner stepped around the entire circumference of the tree trunk. The result was a dropping of all of the fruit from the tree without any harm being done to the tree or fruit. The fruit when freed from the tree dropped straight down due to gravity. If the vibrations were slower so as to wave the branches according to their flexing moment, the fruit would have been thrown laterally a slight distance while dropping. This disadvantage was overcome by the high frequency of vibration applied to the tree. The shaking of the tree in a single direction does not permit all the fruit to be removed from the tree.

The unique feature of my invention is the control of the magnitude, direction, character and/or frequency of forces produced by two or more rotating eccentric masses in a machine and causing these forces to be applied to a load or work to agitate it in a particular manner for a particular purpose. The direction of the force developed is determined by noting the position when two eccentric rotating weights of a pair, pass each other and then noting the direction of parallel radial lines extending from the centers of these weights to the axis or axes of rotation of the weights and this will indicate the direction of the force developed and transmitted to the base that supports the mechanical movement.

When the eccentric masses are rotated in opposite directions, the forces tend to be reciprocable in nature and with moments that are substantially straight line or arcuate, this depending upon the relative speeds of the rotating masses. The direction of the straight line force can be altered angularly by altering the angular position between the rotating eccentric weights. By changing the eccentricity of one of the two counter rotating weights, while operating them at the same speed, I can produce an arcuate reciprocating force, the direction of which is controlled by the relative positions of the rotating masses.

I claim:

In a mechanical movement:
(a) a base;
(b) a pair of shafts rotatably mounted on said base in spaced relation to one another;
(c) an eccentric mass carried by each shaft; and
(d) means for rotating each shaft and mass at the same time and in opposite directions and at different speeds from one another for causing the eccentric masses to pass each other at constantly shifting different points in two circles circumscribed by the eccentric masses as they rotate about the shaft axes;
(e) said means including a belt and pulley drive mechanism for one of the shafts and associate eccentric mass and a variable speed mechanism for the other shaft and associate eccentric mass;
(f) whereby the rotation of the variable speed shaft and associate eccentric mass can be made to go continuously slightly faster or slower than the other shaft and associate eccentric mass with the result that the two rotating eccentric masses will create a reciprocable approximately straight line force which will be applied to the base, this force constantly changing in direction by small increments with the shaft axes constituting the pivotal and midway point between the ends of each straight line force.

References Cited by the Examiner

UNITED STATES PATENTS

| | | |
|---|---|---|
| 657,516 | 9/1900 | Coleman _____ 74—192 X |
| 2,309,172 | 1/1943 | De Kanski _____ 74—61 |
| 2,445,175 | 7/1948 | Hittson _____ 74—61 |
| 2,505,753 | 5/1950 | Cleveland _____ 74—61 |
| 2,522,906 | 9/1950 | Smith _____ 56—328 |
| 3,053,379 | 9/1962 | Roder et al. _____ 74—87 X |

FOREIGN PATENTS

| | | |
|---|---|---|
| 765,723 | 3/1934 | France. |
| 822,979 | 11/1951 | Germany. |
| 415,309 | 12/1933 | Great Britain. |
| 561,866 | 4/1957 | Italy. |

MILTON KAUFMAN, *Primary Examiner.*

BROUGHTON G. DURHAM, *Examiner.*